| United States Patent [19]
Fabrizio

[11] 3,843,787
[45] Oct. 22, 1974

[54] WATER SOLUBLE DERIVATIVE OF ERYTHROMYCIN
[75] Inventor: Gerardo Fabrizio, Santa Maria Caputa Vetere, Italy
[73] Assignee: Pierrel S.p.A., Via Turati, Milan, Italy
[22] Filed: Dec. 8, 1972
[21] Appl. No.: 313,485

Related U.S. Application Data
[62] Division of Ser. No. 2,685, Jan. 13, 1970, Pat. No. 3,764,595.

[30] Foreign Application Priority Data
Jan. 15, 1969 Great Britain.................. 02437/69

[52] U.S. Cl. .............................................. 424/181
[51] Int. Cl............................................. A61k 21/00
[58] Field of Search ................................... 424/181

[56] References Cited
UNITED STATES PATENTS

| 2,761,859 | 9/1956 | Hoffhein ............................ 260/210 |
| 2,830,982 | 4/1958 | Stainbrook et al. ................ 260/210 |
| 2,857,312 | 10/1958 | Stephens............................ 167/65 |
| 2,967,129 | 1/1961 | Clark .................................. 167/65 |
| 3,040,025 | 6/1962 | Murphy ............................. 260/210 |
| 3,276,956 | 10/1966 | Cardinal ........................... 167/53.1 |

Primary Examiner—Henry A. French
Attorney, Agent, or Firm—Bacon & Thomas

[57] ABSTRACT

A new water soluble derivative of erythromycin, namely, erythromycin aspartate, is provided. The product is prepared by reacting erythromycin base with a substantially equimolar amount of aspartic acid or the ammonium salt of aspartic acid. The resulting erythromycin aspartate, which may be recovered as a white crystalline powder, is quite soluble in water and provides substantially neutral aqueous solutions which may be administered by the parenteral route, as well as by other modes of administration, for treatment of infections caused by gram-positive bacteria.

3 Claims, No Drawings

WATER SOLUBLE DERIVATIVE OF ERYTHROMYCIN

This is a division, of application Ser. No. 2,685, filed Jan. 13, 1970, and issued as Pat. No. 3,764,595 issued Oct. 9, 1973.

It is known that erthromycin and certain erythromycin derivatives in the form of salts or esters, are useful compounds for the treatment of diseases and infections caused by gram-positive bacteria both in veterinary and human medicine.

The administration of erythromycin or its derivatives can be made by various routes, as for instance orally, intramuscularly, intravenously and rectally. However, the route of administration which achieves the best therapeutic results is the parenteral one.

Erythromycin in the form of the free base has a very slight solubility in water (1 mg./ml.) and consequently its solutions have no therapeutical interest for the parenteral administration.

Among the various salts and esters of erythromycin already known and employed, there are some showing a very high solubility in water while still retaining a good antibiotic activity, and giving consequently solutions of therapeutically valuable concentrations.

However, the solubility of a certain antibiotic compound is not the only point which should be considered when evaluating its suitability and possible utilization for therapeutical purposes.

The toxicity and tolerability, along with the antibiotic activity determined as the concentration in the blood during the time of treatment (blood levels), are of the same and even greater order of importance.

As erthromycin has a basic nature, its conversion to salt form by reaction with an acid represents one of the best ways for obtaining a water soluble derivative. The choice of the salt-forming acid is of great importance as the chosen acid should be able to solubilize the erythromycin to a certain degree and must have a well determined acidity force in order to give a reduced acidity degree to the aqueous solutions of the erythromycin salts deriving therefrom.

It has been found that the products resulting from the acidification of erythromycin base with dicarboxylic-amino acids are very satisfactory. The dicarboxylic-amino acids provide a buffering action in the aqueous solutions when one carboxylic group only is neutralized by erythromycin.

The preferred product is erythromycin aspartate which may be obtained by reacting erythromycin with 1-aspartic acid or with a salt thereof. The erythromycin aspartate shows a very good solubility in water, more than 100 mg./ml. at a pH range 6.0 – 7.0 while retaining almost all the antibiotic activity.

The pH value of the aqueous solution of erythromycin aspartate is practically neutral, thus maintaining a very good stability of the antibiotic substance which is known to be inactivated at acid pH values.

Another advantage of the product of the present invention is that, the aqueous solutions of erythromycin aspartate being substantially neutral, the drug can be administered by the parenteral route. Moreover the compound may be included, without inconvenience, in the food and drinking water of animals.

The best way for preparing erythromycin aspartate is by the cross-reaction (double exchange-reaction) between erythromycin base and the ammonium salt of 1 aspartic acid. The method has the advantage of being exclusively carried out in a neutral or alkaline environment, maintaining consequently a good stability of the antibiotic substance.

Practically, the stoichiometric quantity of erythromycin base, which is previously dissolved in methanol, is added to an aqueous solution of ammonium 1-aspartate. Ammonia is given off immediately and the pH value decreases to a constant value of about 7. The aqueous solution may then be evaporated to dryness under vacuum at 50°C maximum. A white crystalline powder is obtained, which is soluble in water at a concentration of 100 mg./ml.

The erythromycin aspartate obtained by this method shows a purity degree which is quite satisfactory for therapeutic use and can also be employed as a feed supplement for animal use.

The preparation of the solid erythromycin aspartate from solution may be carried out by means of the commonly employed methods of liophylisation of the aqueous solution thereof, or by spray-drying the same solutions.

The aqueous solution of the water soluble erythromycin salt, which has a neutral pH, can also be satisfactorily employed in human therapy. However, when an erythromycin aspartate for human use is required, it is advisable to isolate the product by liophylisation. The product isolated by liophylisation presents the identical chemico-physical characteristics of the one obtained as before described.

The following examples are given by way of illustration of the invention only, without constituting any limitation of the same:

EXAMPLE 1

14.68 gr. of erythromycin base and 2.66 gr. of 1-aspartic acid are suspended in 175 ml. of water. The solution is stirred for half an hour, then filtered and the reaction product is isolated from the solution by means of liophylisation. 17.3 gr. of the product with the following characteristics are obtained:

| | |
|---|---|
| Aspect | White, crystalline powder soluble in water |
| Molecular weight | 866.3 |
| Microbiological activity | 800–840 γ/mg. as erythromycin base |
| Rotatory power | 55° ± 5° |
| pH (10% solution) | 6.0 – 7.0 |
| Solubility in water | Not less than 10% |
| Contents of 1-aspartic acid | 13.5 – 16.0% |

EXAMPLE 2

4.0 gr. of 1-aspartic acid are suspended in 15 ml. of water and are solubilized by adding 0.03 moles of ammonium hydroxide.

22.0 gr. of pure erythromycin base are dissolved in 75.0 ml. of methanol, added to the aqueous solution and the resulting solution is stirred for 30 minutes, then the erythromycin aspartate is isolated by drying the solution under vacuum at the temperature of 50°C.

26 gr. of erythromycin aspartate are obtained.

The analytical charcteristics of the product are the same as those illustrated for the product in Example 1.

The following details of pharmacological tests are given to illustrate the activity and effectiveness of erythromycin aspartate and to pharmacologically characterize it.

DETERMINATION OF THE CONCENTRATION OF THE ANTIBIOTIC IN THE BLOOD

The blood levels in the dog have been determined by injecting intramuscularly and intravenously 5 mg. of erythromycin aspartate activity, calculated as erythromycin base, per Kg. of body weight, according to D. Grove and W. Randall.

in the following table the reported average values are expressed in $\gamma$/ml. of serum:

Intramuscular administration

| Erythromycin aspartate 5 mg. activity/kg. b.w. | | | | | |
|---|---|---|---|---|---|
| 30 minutes | 1hr | 2hr | 4hr | 8hr | 24hr |
| 1.45 | 1.35 | 0.70 | 0.40 | 0.058 | 0 |

Intravenous administration

| Erythromycin aspartate 5 mg. activity/Kg. b.w. | | | | | |
|---|---|---|---|---|---|
| 30 minutes | 1hr | 2hr | 3hr | 8hr | 24hr |
| 1.60 | 1.28 | 0.58 | 0.26 | 0.062 | 0 |

ACUTE TOXICITY

The erythromycin aspartate is a product characterized by a very low toxicity; in fact the LD50 determined after intravenous administration in a mouse has resulted 332 mg. activity per Kg. b.w.

Such a value is highly competitive in correspondence with other soluble salts of erythromycin.

LOCAL TOLERABILITY

The local tolerability of the erythromycin aspartate has been tested by "oedema test" provocated on the mouse paw by a sub-plantare injection of 0.1 ml. of water solution dosed at 50 mg. activity/ml. of erythromycin aspartate in comparison with erythromycin lactobionate; after 30′, 60′, 120′, from administration, no different behavior has been evidenced between the two products already tested.

The new product may be formulated in pharmaceutical composition form by use of a suitable vehicle or carrier. Sterile injectable liquids including water, saline solution, and the like, may be used as a solution or suspending medium for preparing injectable solutions. The product may also be compounded with sterile powders, e.g., water-soluble excipients, etc. which act as a carrier for the active material for preparing solutions, suspensions or other desired preparations.

What I claim is:

1. A pharmaceutical composition containing erythromycin aspartate in association with a suitable pharmaceutical vehicle.

2. A pharmaceutical composition as claimed in claim 1, in which the vehicle is a sterile injectable solution or suspension medium, or a sterile powder providing a carrier for preparing a solution or suspension.

3. An aqueous solution for adding to animal drinking water containing erythromycin aspartate, prepared by dissolving in water a solid composition containing erythromycin aspartate with or without a water-soluble excipient.

* * * * *